(12) United States Patent
Lee et al.

(10) Patent No.: US 6,371,455 B1
(45) Date of Patent: Apr. 16, 2002

(54) GAS/LIQUID CONTACTING APPARATUS

(76) Inventors: Adam T. Lee, 4952 Cape Coral Dr., Dallas, TX (US) 75287; Karl T. Chuang, 8742-117 Street, Edmonton, Alberta (CA), T6G 1R5

(*) Notice: Subject to any disclaimer, the term of this patent is extended or adjusted under 35 U.S.C. 154(b) by 0 days.

(21) Appl. No.: 09/754,581

(22) Filed: Jan. 5, 2001

(51) Int. Cl.[7] .................................................. B01F 3/04
(52) U.S. Cl. ................................. 261/114.1; 261/114.5
(58) Field of Search ........................... 261/114.1, 114.2, 261/114.3, 114.4, 114.5

(56) References Cited

U.S. PATENT DOCUMENTS

| | | | | |
|---|---|---|---|---|
| 2,681,218 A | * | 6/1954 | Donovan | 261/114.1 |
| 4,496,430 A | * | 1/1985 | Jenkins | 261/114.5 |
| 5,895,608 A | * | 4/1999 | Lee et al. | 261/114.1 |
| 6,003,847 A | * | 12/1999 | Lee et al. | 261/114.1 |
| 6,250,611 B1 | * | 6/2001 | Pilling et al. | 261/114.5 |

* cited by examiner

Primary Examiner—C. Scott Bushey

(57) ABSTRACT

A gas/liquid contacting apparatus is provided wherein sedimentation of particulate solids at the corner of liquid overflow weirs of perforated trays is substantially reduced. This is achieved by bowing outwardly in a downstream direction the overflow weirs, to even out the liquid flow over them, and providing downcomer chutes from the weirs, which conform to the weir contour at the upper end. The downcomer chutes have sides converging in a downstream direction on a base to draw liquid away from the weir sides. The invention may be used in a single, two or four pass gas/liquid contacting apparatus.

6 Claims, 4 Drawing Sheets

GAS/LIQUID CONTACTING APPARATUS

BACKGROUND OF THE INVENTION

Perforated trays with downcomers are one of the most commonly used internals in industrial columns or towers for contacting a gas and a liquid. In such columns, liquid flows across the trays and down through the downcomers from tray to tray, while gas permeates upwardly through the trays foaming liquid thereon.

Many of these columns, which may be used for distillation, absorption and stripping operations, involve having solids present in particulate form, see for example, "Subdue Solids in Tower", A. W. Stoley et al, Distillation and Other Industrial Separations, pages 95–104, dated January 1995, published in Chemical Engineering Progress. Stoley et al, center column, lines 25–38, page 99, states that "a major problem with downcomers is the creation of dead spots near the tower wall (opposite the downcomer outlet), near outlet wiers, and along the tower shell at the bottom of the downcomer".

Various proposals have been made, see, for example, U.S. Pat. No. 2,646,977, dated Jul. 28, 1953, U.S. Pat. No. 4,749,528, dated Jun. 7, 1988, J. T. Lavin, U.S. Pat. No. 5,895,608, dated Apr. 20, 1999, A. T. Lee et al and U.S. Pat. No. 6,003,847, dated Dec. 21, 1999, A. T. Lee et al, to reduce the tendency of liquid to dwell at the periphery of the tray adjacent the column wall so that distillation is equally effective at the peripheral and central areas.

While these proposals have achieved various degrees of success in avoiding stagnant zones in liquid adjacent the column wall, no one has appreciated that i) narrowing of the downcomer passage sides adjacent to the column wall, all of the way down the downcomer, will always cause stagnant zones in the liquid at the extremities, and ii) even with these narrow extremities eliminated to some extent, there is still a problem in that liquid entering the downcomer and flowing down the downcomer at the narrow extremities will flow slower at the entry causing back-up resulting in sedimentation of particulate solids to occur at the entry.

There is a need for a gas/liquid contacting apparatus wherein the formation of stagnant zones of liquid due to narrowing extremities of downcomers is substantially reduced, and where sedimentation of particulate solids due to back-up of downcomer liquid at these extremities is substantially reduced.

SUMMARY OF THE INVENTION

According to the present invention, there is provided a gas-liquid contacting apparatus, comprising:
a) an upwardly extending casing,
b) a series of perforated trays partitioning the casing at different levels and having generally crescent shaped, liquid drainage openings adjacent the casing, for, in operation, causing liquid descending in the casing to flow across the trays and be frothed thereon by gas, to be contacted therewith, with is ascending in the casing and permeating the perforations in the trays, and
c) for each drainage opening,
   i) a liquid overflow weir, adjacent thereto and bowing outwardly to follow the contour of the entry to that drainage opening, and for maintaining a level of liquid flowing on the tray being drained by that drainage opening, and
   ii) an inclined,—overflow liquid conveying, downcomer chute; the downcomer chute comprising a base and outwardly extending side walls, the upper ends of which generally conform with the contour of the bow of the overflow wier after which the side walls gradually converge inwardly on the base, from upper ends, to form a chute leading to lower ends, at which conveyed liquid is deposited from the chute on to a portion to the tray therebelow.

In some embodiments of the present invention, the. overflow weirs are formed of a plurality of substantially flat strips which are joined at oblique angles to form the bow shape of the overflow weirs.

In other embodiments of the present invention, each downcomer chute comprises a plurality of lengthwise extending substantially flat panels, joined along their lengthwise extending edges to provide the base and the side walls.

In other embodiments of the present invention the drainage openings are crescent shaped, and the weirs and downcomer chutes are curved to blend smoothly with the crescent shapes of the drainage openings.

In yet other embodiments of the present invention, each drainage opening is one of two similar side drainage openings provided at opposite sides of each perforated tray, each overflow weir is one of two similar overflow weirs for the side drainage openings, and each downcomer chute is one of two similar downcomer chutes for the weirs, and between each pair of perforated tray with two opposed drainage openings, a further perforated tray is provided comprising two segments, each to receive liquid from one of the downcomer chutes, the perforated tray segments providing a central, downcomer opening between them, the central downcomer openings being flared at the sides, and for each side of the central downcomer openings, there is provided
   i) a weir conforming to the contour of that side, and
   ii) a downcomer chute comprising a base and two side walls conforming to the contours of the weir, the side walls gradually converging inwardly on the base, to form a chute therewith for depositing liquid on a perforated tray therebelow with drainage openings on opposite sides.

In yet other embodiments of the present invention each drainage opening is one of two, similar, side drainage openings provided at opposite sides of each perforated tray, and
   a) each overflow weir is one of two similar overflow weirs for the side drainage openings, and each downcomer chute is one of two similar downcomer chutes for the weirs, and a central drainage opening is provided in each perforated plate, the central downcomer openings being flared at the sides, and for each side of the central downcomer opening, there is provided
      i) a weir conforming to the contour of that side,
      ii) a downcomer chute comprising a base and two side walls the side walls conforming to the contours of the weirs, and gradually converging inwardly on the base, to form a chute therewith, and
   b) for each perforated tray with side and central drainage openings, there is provided a further perforated tray therebelow, each further perforated tray having two longitudinally extending, intermediate, drainage openings, each extending along a path between a side drainage opening and a central drainage opening in the perforated tray there above, for each side of an intermediate drainage opening there is provided,
      iii) a weir conforming to the contour of that side, and
      iv) for each weir a downcomer chute conforming to the contour of that weir and gradually converging inwardly therefrom to form a chute therewith for depositing liquid on a perforated tray therebelow.

BRIEF DESCRIPTION OF DRAWINGS

In the accompanying drawings which illustrate, by way of example, embodiments of the present invention.

DETAILED DESCRIPTION OF THE PREFERRED EMBODIMENTS

Figure 1:
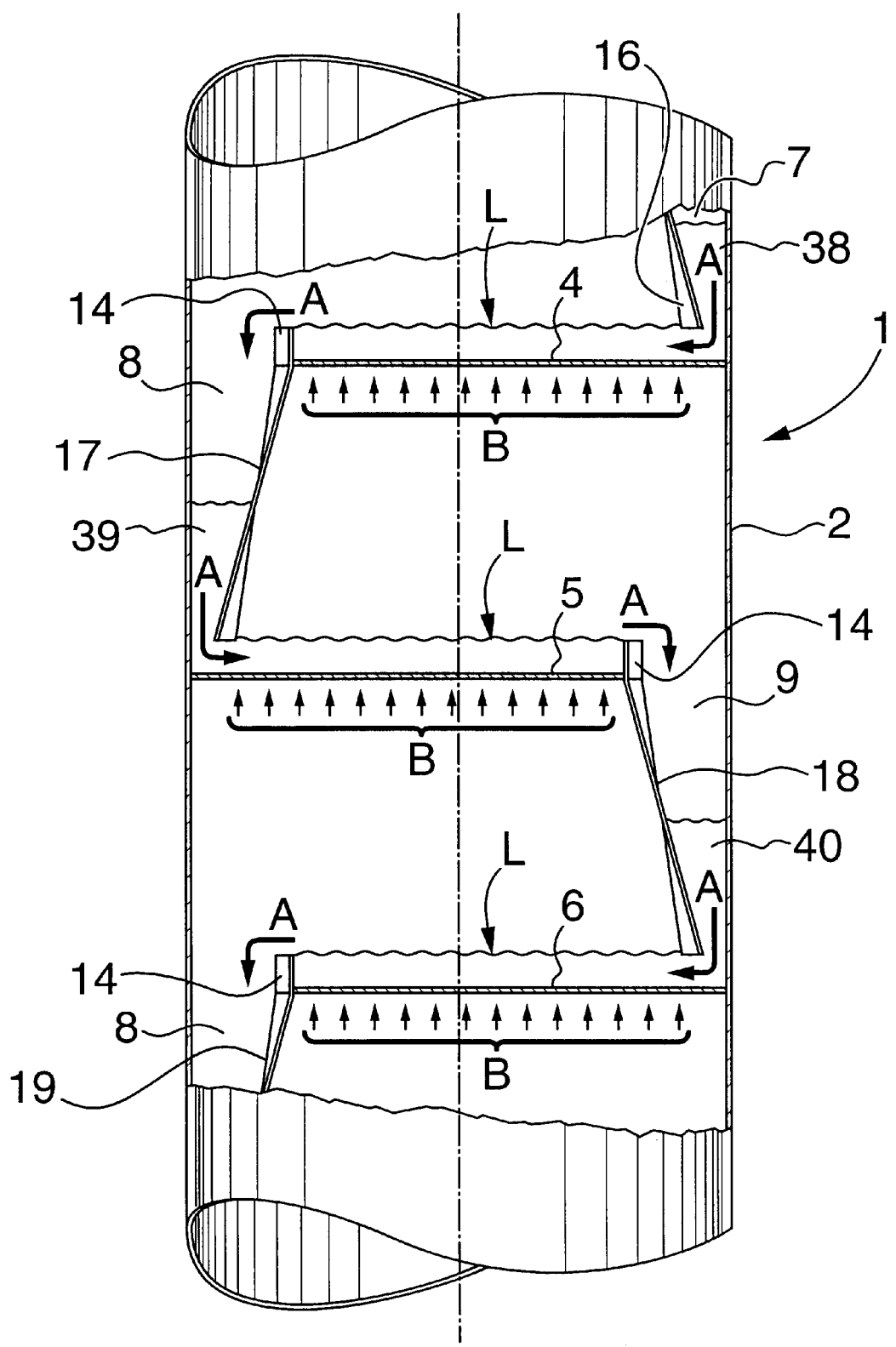
FIG. 1 is a schematic, side view of a lengthwise extending portion of a gas/liquid contacting apparatus with a portion of the casing removed to reveal the interior.
Figure 2:
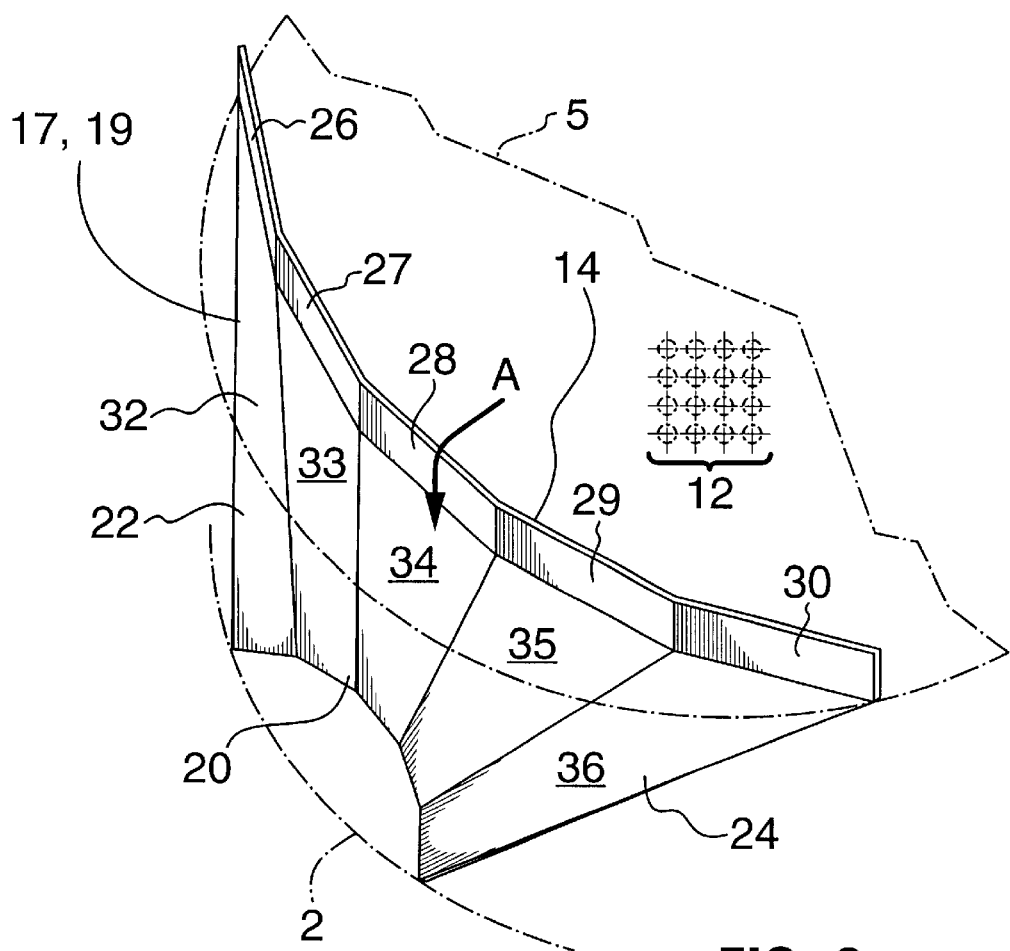
FIG. 2 is a perspective, schematic view of a portion of the apparatus shown in FIG. 1, containing a weir and downcomer chute.

Referring now to FIGS. 1 and 2, there is shown a gas-liquid contacting apparatus, comprising:

a) an upwardly extending casing 2, b) a series of perforated trays, 4 to 6, partitioning the casing 2 at different levels and having generally crescent shaped, liquid, drainage openings 7 to 9 respectively, adjacent the casing 2, for in operation, causing liquid descending in the casing, as shown by arrows A, to flow across the trays 4 to 6 and be frothed thereon by gas, to be contacted therewith, which is ascending in the casing 2, as shown by arrows B, and permeating the perforations, some of which are shown and designated 12 (FIG. 2), in the trays 4 to 6, and c) for each drainage opening 7 to 9,
i) a liquid overflow weir 14, adjacent thereto and bowing outwardly, as shown in FIG. 2, to follow the contour of the entry to that drainage opening 7 to 9, and for maintaining a level L (FIG. 1) of liquid flowing on the tray 4 to 6 being drained by that drainage opening 7 to 9, and
ii) an inclined, overflow liquid conveying, downcomer chute 16 to 19, the downcomer chute comprising a base 20 (FIG. 2) and outwardly extending side walls 22 and 24, the upper ends of which generally conform with the contour of the bow of the liquid overflow weir 14, after which the side walls 22 and 24 gradually converge inwardly on the base 20, from the upper ends, to form a chute leading to lower ends, at which conveyed liquid is deposited from the chute on to a portion of the tray 4 to 6 therebelow.

It will be appreciated that openings 7 and 9 on trays 4 and 6, their associated weirs 14, and downcomer chutes 16 and 18 face in the opposite direction to these elements shown in FIG. 2, but in other respects are the same.

In this embodiment of the present invention, the overflow weirs 14 are formed of a plurality of substantially flat strips 26 to 30 which are joined at oblique angles to form the bow shape of the overflow weirs 14.

Further in this embodiment of the present invention, the downcomer chutes 16 to 19 each comprise a plurality of lengthwise extending, substantially flat panels 32 to 36, joined along their longitudinally extending edges to provide the base 20 and the converging side walls 22 and 24.

In operation, liquid is fed into an upper portion of the casing 2, to flow along the path indicated by arrows A, and exit from the lower end of the casing in a known manner. Pressurized gas is fed into a lower portion of the casing 2 to flow along the path indicated by arrows B, and exit from the top of the casing 2 in a known manner.

Liquid flowing across the trays 4 to 6, from the downcomer chutes 16 to 19, is caused to form pools on them by the weirs 14, and these liquid pools are frothed by the gas flowing upwardly and permeating the perforations such as those designated 12 (FIG. 2), in the trays 4 to 6. This frothing causes high surface area contact between the liquid and the gas.

The frothed liquid flowing over the weirs 14 falls down the downcomer chutes 16 to 19 to the perforated tray 4, 5, 6 there below and forms liquid pools 38 to 40 (FIG. 1) between the downcomer chutes and the wall of casing 2. These liquid pools provide liquid seals and substantially avoid gas escaping up the spaces bounded by the downcomer chutes 16 to 19 and the wall of the casing 2.

As is clearly shown in FIG. 2, the liquid overflow weirs 14 bow outwardly in a liquid downstream direction, and this bowing outwardly tends to distribute more evenly, liquid flowing over the weirs 14, and markedly reduces the tendency for the formation of stagnant zones at the entries to the outer extremities of the drainage openings 7 to 9. Reduction of stagnant zones at the extremities of the drainage openings 7 to 9, in this manner, markedly reduces sedimentation in these zones of any particulate material entrained in the flowing liquid.

After flowing over the weirs 14, the liquid flows down over the downcomer chutes 16 to 19. As the upper ends of the downcomer chutes generally conform with the contour of the bow of the overflow weirs 14, any back up of liquid at the extremities of the drainage openings 7 to 9 is substantially reduced. Furthermore liquid flowing down the downcomer chutes 16 to 19 is drawn by the converging side walls 22 and 24 away from the extremities of the drainage openings towards a central, faster flowing, lower, narrowed portion of the downcomer chutes 16 to 19. This also markedly reduces any back up of liquid at the extremities of the drainage openings 7 to 9, and the occurrence of sedimentation of particulate in stagnant zones in these zones.

In FIGS. 3 to 7, similar parts to those shown in FIGS. 1 and 2 are designated by the same reference numerals, and the previous description is relied upon to describe them.

Figure 3:
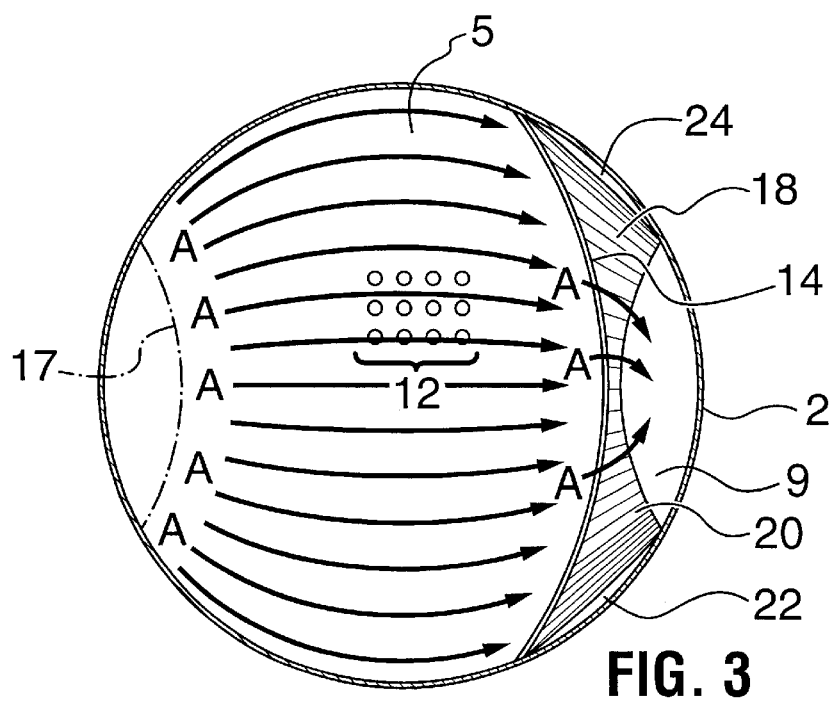
FIG. 3 is a schematic plan view of a different weir and downcomer chute to those shown in FIGS. 1 and 2, FIGS. 4 and 5 are schematic plan views, of different perforated trays, of a two pass, gas/liquid contacting apparatus

In FIG. 3, a tray 5 is shown having a drainage opening 9 which is curved to be crescent shaped, a weir 14 which is curved to follow and blend with the crescent shape and an inclined downcomer chute 18 having a base 20 and side walls which are shaped to blend smoothly with the weir 14 the downcomer chute 18. In this embodiment, trays 4 and 6, and their weirs 14 and downcomer chutes 17 and 19, are mirror images of what is shown in FIG. 3.

The embodiment shown in FIG. 3 functions in the same manner as that described with reference to FIGS. 1 and 2. However, a smoother flow of liquid is achieved at the weirs 14 and down the downcomer chutes 17, 18 and 19, because corner forming channels in the direction of liquid flow are avoided. In this embodiment, even less sedimentation of particulate solids entrained in the liquid occur. This embodiment is particularly useful where the particulate solids are in finely divided form having small particle size.

Figure 4:
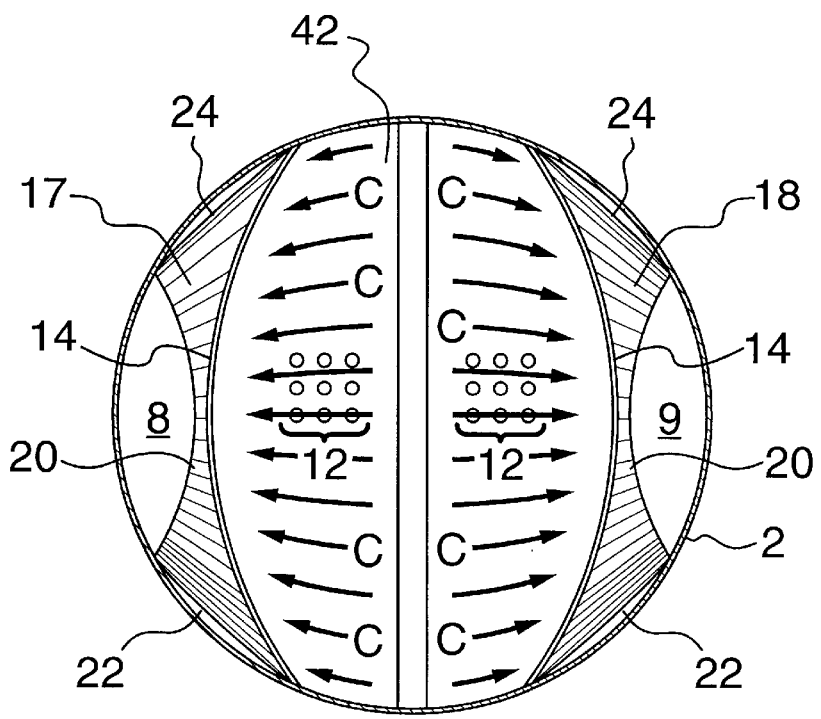
Figure 5:
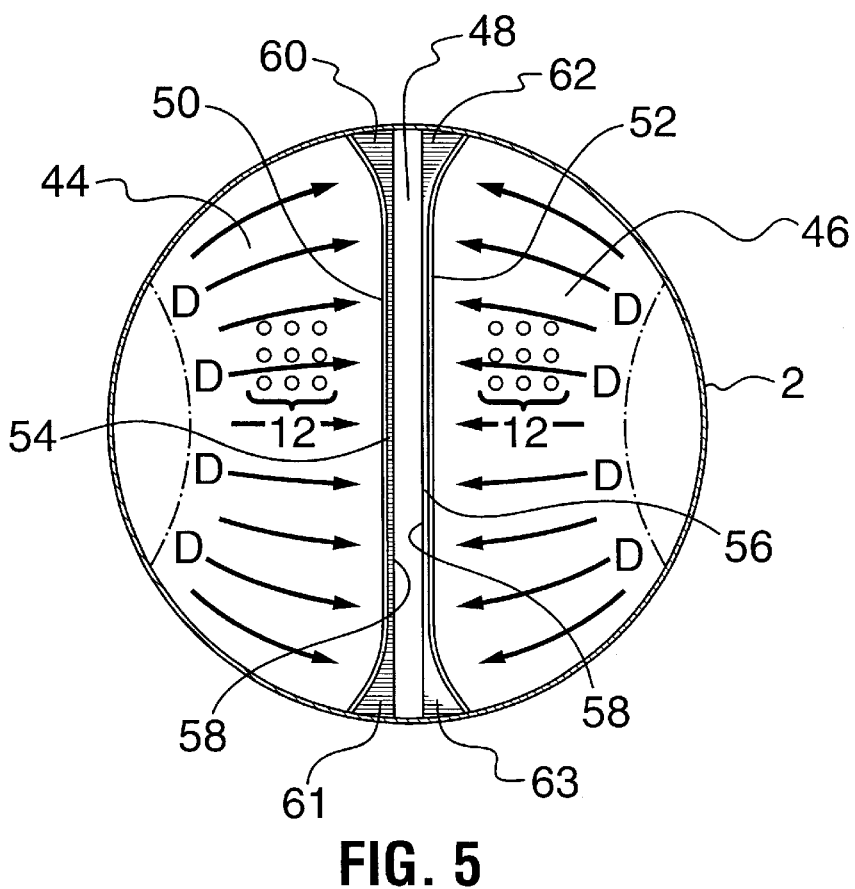

In FIGS. 4 and 5, an embodiment of the present invention is shown for use with what is known in the art as a two pass gas/liquid contacting apparatus.

In FIGS. 4 and 5, a perforated tray 42 (FIG. 4) is provided with two crescent shaped, liquid drainage openings 8 and 9 at opposite sides of the casing 2, each drainage being provided with a weir 14, and a downcomer chute 17 and 18, similar to those described with reference to FIG. 3. This embodiment may be described as similar to that of FIG. 3, except that the weir 14 and downcomer chute 18 of FIG. 3, is one of two similar weirs 14 and downcomer chutes provided at sides of the casing.

The downcomer chutes 14 (FIG. 4) deliver liquid to two, perforated tray segments 44 and 46 (FIG. 5) with a central drainage opening 48 between them. The downcomer opening 48 is flared at each side and has weirs 50 and 52 on each side following the contour of the downcomer opening 48. Downcomer chutes 54 and 56 extend downwardly from the weirs 50 and 52, the downcomer chutes 54 and 56 are sloped towards one another to terminate with a gap therebetween, at which liquid is delivered to another perforated tray 42 (FIG. 4) therebelow. The downcomer chutes 54 and 56 each comprise a base 58 and side walls 60, 61 and 62, 63 which generally, at their upper ends, conform to the contours of the weirs 50 and 52.

This embodiment of the present invention operates in a similar manner to those previously described with gas passing upwardly through the pores 12, except that with alternate perforated trays 42 and 44, 46 arranged one above another in a casing 2, liquid flows outwardly in the directions of arrows on perforated trays 42 (FIG. 4), over the weirs 14 and down the downcomer chutes 17 and 18 to perforated tray 44, 46. The liquid then flows inwardly in the direction of arrows D, over the weirs 50 and 52 and down the downcomer chutes 54 and 56 to another perforated tray 42.

Figure 6:
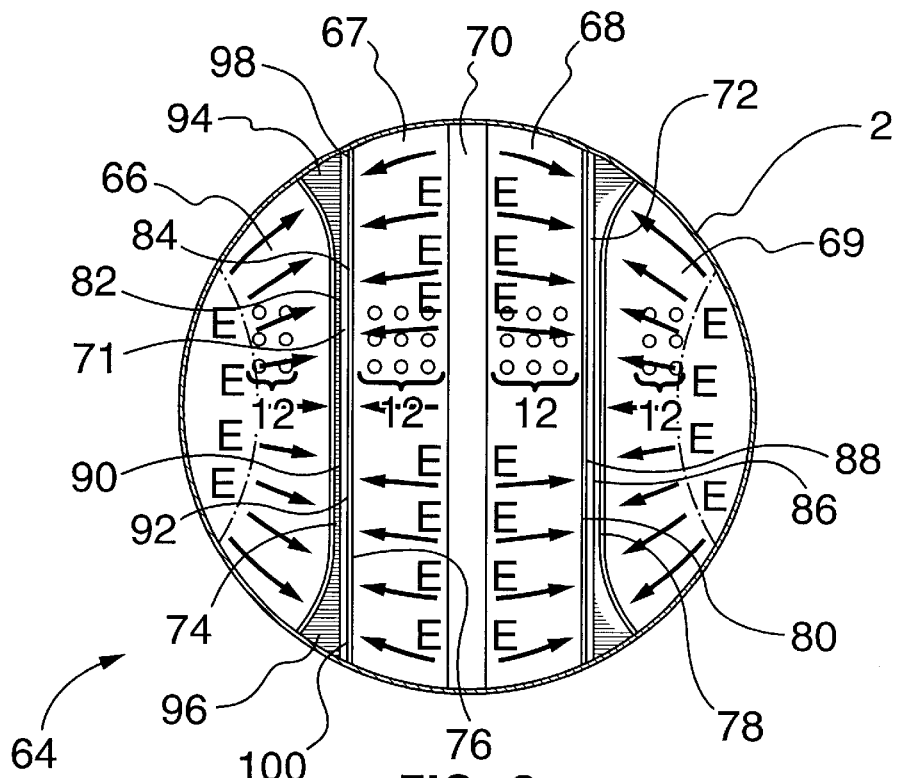
FIGS. 6 and 7 are similar schematic plan views to those of FIGS. 4 and 5, but of a four pass gas/liquid contacting apparatus.
Figure 7:
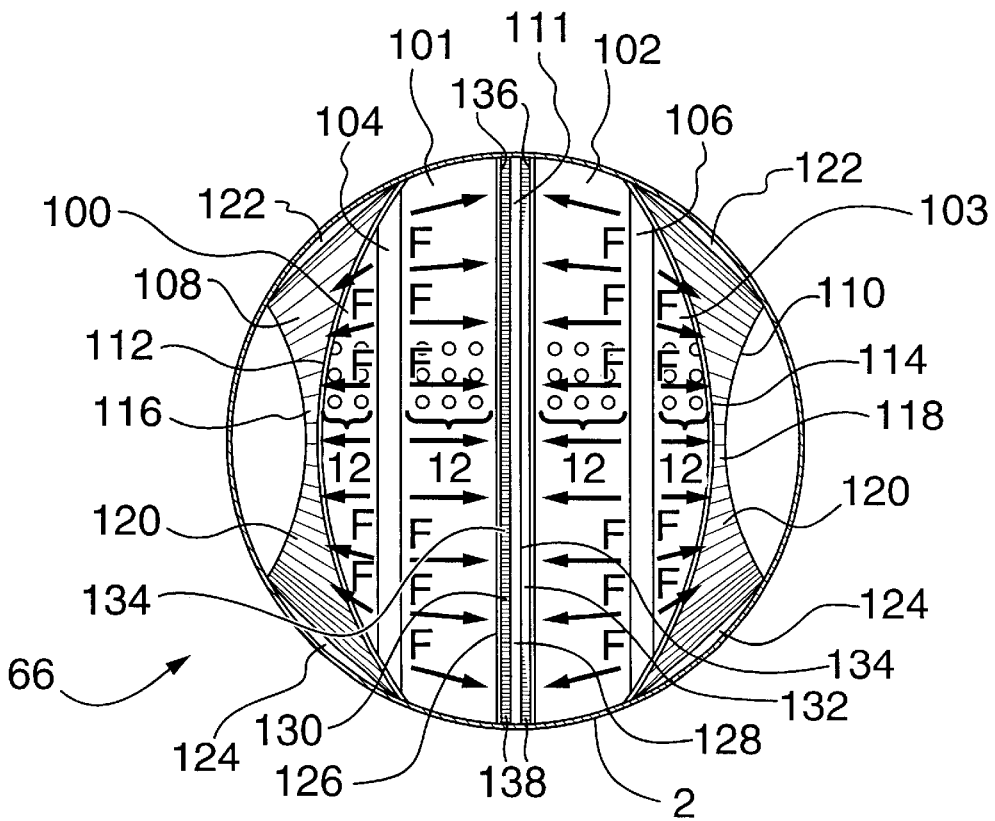

In FIGS. 6 and 7 an embodiment of the present invention is shown for use in what is known in the art as a four pass gas/liquid contacting apparatus.

In this embodiment, perforated tray assemblies generally designated 64 (FIG. 6) and 66 (FIG. 7) are arranged alternately one above the other in casing 2.

The perforated tray assembly 64 (FIG. 6) comprises four side-by-side perforated tray sections 66 to 69 extending across the interior of the casing 2 in pairs 66, 67 and 68, 69 in opposite side portions of the interior of the casing 2. The central perforated tray portions 67 and 68 are joined by a strip 70. Each pair 66, 67 and 68, 69 has a longitudinally extending gap between them defining a drainage opening 71 or 72 with flared ends. Two weirs 74, 76 and 78 80 are provided on opposite sides of, and following the contours of, the openings 71 and 72. Inclined downcomer chutes 82, 84 and 86, 88 are provided following the contours of the weirs 74, 76 and 78, 80. Each downcomer chute 82, 84 and 86, 88 has a base such as bases 90 and 92 for downcomer chutes 82 and 84, together with side walls 94, 96 and 98, 100, all of which follow the contours of the overflow weirs 74, 76 and 76, 78 at their upper ends.

The perforated tray assembly (FIG. 7) also comprises four side-by-side perforated tray sections 100 to 103 extending across the interior of the casing in pairs 100, 101 and 102, 103 in opposite side portions of the interior of the case 2. Strips 104 and 106 are between and join each pair of strips 100, 101 and 102, 103. Each outer strip 100 and 103 defines an outer crescent shaped drainage opening 108 and 110 with the wall of the casing 2, and the inner strips 101 and 102 have a longitudinally extending gap between them defining a central drainage opening 111. Each drainage opening 108 and 110 is provided with weir 112 and 114 following the contour of the strips 100 and 103, and downcomer chutes 116 and 118 following the contours of the weirs 112 and 114 at their upper edges. The downcomer chutes 116 and 118 each comprise a base 120 and side walls 122 and 124 as described with reference to FIG. 3.

The central drainage opening 111 is provided with weirs 126 and 128, and downcomer chutes 130 and 132. Each downcomer chute 130 and 132 comprises a base 134 and side walls 136 and 138.

In this embodiment, liquid on the perforated tray assembly 64 (FIG. 6) flows in the directions of arrows E across the tray assembly 64 and down the downcomer chutes 82, 84 and 86, 88 to perforated tray assembly 66 (FIG. 7). Liquid on tray assembly 66 flows across the tray assembly 66 in the directions of arrows F to flow down the downcomer chute 116, 118, 130 and 132.

We claim:

1. A gas-liquid contacting apparatus, comprising:
    a) an upwardly extending casing,
    b) a series of perforated trays partitioning the casing at different levels and having generally crescent shaped, liquid drainage openings adjacent the casing, for,in operation, causing liquid descending in the casing to flow across the trays and be frothed thereon by gas, to be contacted therewith, which is ascending in the casing and permeating the perforations in the trays, and
    c) for each drainage opening, there is provided,
        i) a liquid overflow weir adjacent thereto and bowing outwardly to follow the contour of the entry to that drainage opening, and for maintaining a level of liquid flowing on the tray being drained by that drainage opening, and
        ii) an inclined, overflow liquid conveying, downcomer chute, the downcomer chute comprising a base and outwardly extending side walls, the upper ends of which generally conform with the contour at the bow of the overflow weir, after which the side walls gradually converge inwardly on the base, from upper ends, to form a chute therewith leading to lower ends, at which conveyed liquid is deposited from the chute on to a portion of the tray therebelow.

2. An apparatus according to claim 1, wherein the overflow weirs are formed of a plurality of substantially flat strips which are joined at oblique angles to form the bow shape of the overflow weirs.

3. An apparatus according to claim 1, wherein each downcomer chute comprises a plurality of lengthwise extending, substantially flat panels, joined along their lengthwise extending edges to provide the base and the side walls.

4. An apparatus according to claim 1, wherein the drainage openings are crescent shaped, and the weirs and downcomer chute are curved to blend smoothly with the crescent shapes of the drainage openings.

5. A gas/liquid contacting apparatus according to claim 1, wherein each drainage opening is one of two similar side drainage openings provided at opposite sides of each perforated tray, each overflow weir is one of two similar overflow weirs for the side drainage opening, and each downcomer chute is one of two similar downcomer chutes for the weirs, and between each pair of perforated tray with two opposed drainage openings, there is provided a further perforated tray comprising two segments, each to receive liquid from one of the downcomer chutes the perforated tray segments providing a central downcomer opening between them, the central downcomer openings being flared at the sides, and for each side of the central downcomer openings, there is provided
    i) a weir conforming to the contour of that side, and
    ii) a downcomer chute comprising a base and two side walls conforming to the contours of the weir, the side walls gradually converging inwardly on the base, to form a chute therewith for depositing liquid on a perforated tray therebelow with drainage openings on opposite sides.

6. A gas/liquid contacting apparatus according to claim 1, wherein each drainage opening is one of two, similar, side drainage openings, provided at opposite sides of each perforated tray, and a) each overflow weir is one of two similar overflow weirs for the side drainage openings, and each downcomer chute is one of two similar downcomer chutes for the weirs, and a central drainage opening is provided in each perforated plate, the central downcomer openings being flared at the sides, and for each side of the central downcomer opening, there is provided
i) a weir conforming to the contour of that side,
ii) a downcomer chute comprising a base and two side walls, the side walls conforming to the contours of the weirs, and gradually converging inwardly on the base, to form a chute therewith, and b) for each perforated tray with side and central drainage openings, there is provided a further perforated tray therebelow, each further perforated tray having two, longitudinally extending intermediate drainage openings, each extending along a path between a side drainage opening and a central drainage opening in the perforated tray thereabove, for each side of an intermediate drainage opening there is provided,
iii) a weir conforming to the contour of that side, and
iv) for each weir a downcomer chute conforming to the contour of that weir and gradually converging inwardly therefrom to form a chute therewith for depositing liquid on a perforated tray therebelow.

* * * * *